(12) United States Patent
Rehrig

(10) Patent No.: US 6,386,895 B1
(45) Date of Patent: May 14, 2002

(54) POWER CABLE ADAPTER

(76) Inventor: Richard B. Rehrig, P.O. Box 1870, San Marcos, CA (US) 92079

( * ) Notice: Subject to any disclaimer, the term of this patent is extended or adjusted under 35 U.S.C. 154(b) by 0 days.

(21) Appl. No.: 09/945,409

(22) Filed: Aug. 30, 2001

(51) Int. Cl.[7] .................................................. H01R 4/60
(52) U.S. Cl. ..................................... 439/191; 174/74 R
(58) Field of Search .................................. 439/191, 638, 439/219, 194; 174/15.6, 74 R, 138 F (56) References Cited

U.S. PATENT DOCUMENTS

| | | | | |
|---|---|---|---|---|
| 2,307,393 A | * | 1/1943 | Crolwey | 128/144 |
| 4,270,824 A | * | 6/1981 | Erickson | 439/15 |
| 5,052,941 A | * | 10/1991 | Hernandez-Marti et al. | 439/194 |
| 5,378,870 A | * | 1/1995 | Krupnicki | 219/137.63 |
| 5,628,655 A | * | 5/1997 | Chamberlain | 439/651 |
| 5,833,482 A | * | 11/1998 | Buchter | 439/288 |
| 6,142,834 A | * | 11/2000 | Liao | 439/676 |

* cited by examiner

Primary Examiner—Tho D. Ta
Assistant Examiner—P Nguyen
(74) Attorney, Agent, or Firm—Lyon & Lyon LLP

(57) ABSTRACT

A power cable adapter for use with a welding torch assembly to electrically couple the power cable in the cable carrying line with the power output stud on the welding machine and communicate the cable carrying line with a fluid supply line for the passage of fluid therethrough. The adapter includes a pair of clam shell type clamp members formed of an electrically conductive material. The clamp members define aligned apertures therein for securing the adapter on the output stud and opposed channels extending laterally therethrough for adjustably securing an electrically conductive U-shaped tube in electrical contact with the clamp members. Connector fittings are provided on the ends of the tube for communication with the torch lines, allowing the torch lines to extend to and from the adapter in a parallel orientation at any desired angular orientation from the welding machine.

18 Claims, 4 Drawing Sheets

POWER CABLE ADAPTER

BACKGROUND OF THE INVENTION

The present invention relates to an adapter for securing the power and fluid carrying cables in a TIG (tungsten inert gas) welding assembly to the output stud on the welding machine (power supply). Welding machines take conventional AC current of high voltage/low amperes and convert the current to welding currents which are typically high amperage/low voltage. The machine allows regulation of the output current to suit the welding requirement. Typically the machine has two output terminals which are usually 0.5 inch diameter metal studs. The electrical leads (welding cables) are attached to these output studs in accordance with the particular machine. The electrode cable is attached to one of the studs and the ground cable to the other. In the case of TIG welding, the TIG torch power cable must be connected to one output stud using an adapter called a power cable adapter. The adapter is constructed of an electrically conductive material, preferably copper or brass, and is provided with a conduit portion extending therethrough having the proper threaded connections at its inlet and outlet ends for attachment of the TIG torch power cable carrying line and either the shield gas supply line in the case of air cooled TIG torches or the water return line in the case of water cooled TIG torches. The adapter is typically secured to and electrically coupled with the output stud by means of an upstanding ear portion on the adapter that has an aperture therein sized to receive the output stud. A large fastening nut threadably engages the stud about the ear portion of the adapter to secure the adapter on the output stud.

Power cable adapters have been machined from brass forgins or from machine components soldered together and configured such that the TIG torch power cable and fluid supply hose are attached at the inlet and outlet ends of the adapter along the same center line. The welding machines for which these adapters were developed were relatively large and there was ample room for such adapters and their straight-through design. In recent years, however, the physical size of these welding machines has been substantially reduced and it has become increasingly difficult to utilize existing power cable adapters with the smaller machines due to the lack of available space near the adapter to accommodate the extending lines. As a result, the lines must be bent at relatively sharp angles proximate the adapter connection, to avoid obstructions which weakens the lines. In addition, the torch lines also carry fluid. The power cable in an air cooled TIG torch assembly has a surrounding hose which carries the shielding gas from the outlet end of the conduit portion of the adapter to the torch head. The gas is supplied to the adapter by a gas supply line. In water cooled TIG torch assemblies the power cable is again provided with a surrounding hose which carries the cooling water back from the torch head to the water return line through the adapter. Thus, the two lines connected to the adapter are in fluid communication through the adapter and when one or both of these lines are sharply bent, they can crimp, restricting the fluid flow therethrough and adversely affecting the operation of the welding apparatus.

In view of the increasing trend toward smaller welding machines in TIG torch welding, there is an increasing need for a power cable adapter which can electrically couple the power cable to the output stud of a welding machine and secure the power cable carrying line and the associated fluid supply line in fluid communication such that tight crimping turns in the lines are avoided irrespective of the size and design configuration of the welding machine. The power cable adapter of the present invention satisfies this need.

SUMMARY OF THE INVENTION

Briefly, the power cable adapter of the present invention is comprised of a pair of clam shell type clamp members formed of an electrically conductive material and configured such that upon being disposed in a substantially adjacent juxtaposition, the clamp members define a channel extending laterally therethrough and a circular aperture, the central axis of which is perpendicular to the central axis of the channel. The channel receives and secures between the two clamp members portions of an electrically conductive fitting tube that is preferably U-shaped and provided with connector fittings at its extended ends for attachment to the welding torch power cable carrying line and the associated fluid (gas or water) supply line. The aperture formed by the two clamp members is sized so as to receive the threaded power output stud on the welding machine such that the two clamp members can be secured together if substantially adjacent juxtaposition on the output stud about the conductive tube by a threaded fastening member. The conductive tube is thus tightly held in place within the lateral channel between the clamp members, creating a physical securement of the tube and an electrical connection between the tube and the power output stud. Upon securing the power cable carrying line to one of the threaded tube fittings, the power cable is electrically coupled to the output stud and upon securing the associated fluid carrying line to the other tube fitting, that line is secured in fluid communication with the power cable carrying line through the fitting tube.

The use of the U-shaped fitting tube in combination with the clam shell type clamp members allows the power cable carrying line and the associated fluid supply line to extend to and from the adapter in a parallel orientation and at any desired angular orientation from the welding machine. As a result, the need for the fluid carrying lines to negotiate relatively sharp turns to accommodate compact welding machine designs is substantially reduced and fluid can flow through the adapter and associated torch lines with minimal restriction. In addition, the clamp configuration of the present invention is not only economical to manufacture and easy to use, it readily accommodates fitting tubes of different configurations to accommodate further variations in machine designs thereby providing an economic and highly versatile power cable adapter for TIG torch applications.

It is the principal object of the present invention to provide an improved power cable adapter for use on a welding machine in a TIG torch assembly that accommodates a wide variety of welding machine configurations and sizes without having to induce sharp bends in either of the fluid carrying lines.

It is another object of the present invention to provide a highly versatile power cable adapter for use with TIG torch assemblies that is of simple construction and economical to manufacture.

These and other objects and advantages of the present invention will become readily apparent from the following detailed description taken in conjunction with the accompanying drawings.

DETAILED DESCRIPTION OF THE PREFERRED EMBODIMENT

Figures 1, 2:
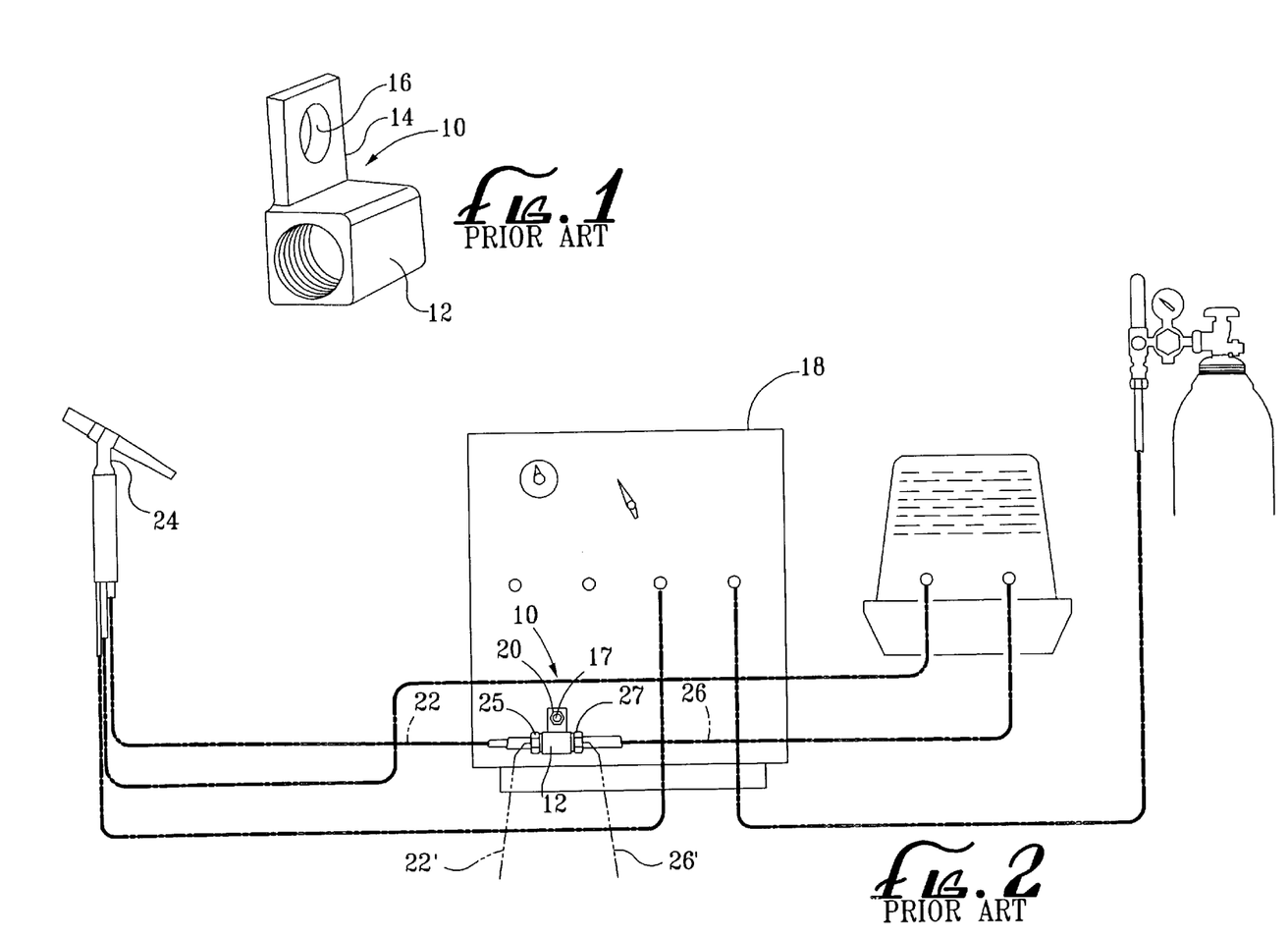
FIG. 1 is a perspective view of a power cable adapter from the prior art.
FIG. 2 is a schematic representation of a water cooled TIG welding apparatus illustrating the use of a power cable adapter of the prior art.

A typical power cable adapter of the type found in the prior art and its use in a TIG welding assembly are illustrated in FIGS. 1 and 2. As seen therein, the adapter 10, which is machined from brass forgings or from machine components soldered, brazed or welded together, defines a straight through conduit portion 12 and an upstanding ear portion 14 having an aperture 16 therein. Aperture 16 is oriented such that it is perpendicular to the central axis of conduit portion 14 and is adapted to receive a threaded output stud 17 on a welding machine 18, whereupon the adapter can be secured on the stud by a threaded nut 20. The power cable carrying line 22 extends from the welding torch 24 and threadably engages tile adapter 10 at one end 25 of conduit portion 12. As noted earlier, in an air cooled TIG torch assembly, power cable carrying line 22 also carries the shielding gas in a hose disposed about the centrally positioned power cable. In a water cooled TIG torch assembly, the return cooling water is carried within the hose disposed about the power cable. Such an assembly is schematically illustrated in FIG. 2. The fluid supply line 26 extends from a second end 27 of the conduit portion of the adapter 10 to either a gas supply in the case of an air cooled torch assembly or to a water circulation system in the case of a water cooled TIG torch assembly (see FIG. 2). Thus, the power cable in line 22 electrically communicates the torch 24 with the welding machine 18 by virtue of direct contact between the power cable and the output stud 17 on the welding machine through the electrically conductive adapter 10 and fluid flow is achieved through lines 22 and 26 via the conduit portion 12 of the adapter.

In power cable adapter 10 and in similar adapters heretofore in use, the fluid flows through the adapter in a straight line between the power cable carrying line 22 and the associated fluid supply line 26. Because typical prior art welding machines were large in size, the axial alignment of the two ends of the conduit portion 12 of the adapter was readily accommodated without the need to sharply bend or otherwise crimp either of two fluid carrying lines 22 or 26. However, if the size and the shape of the welding machine were such that the power cable carrying line 22 and fluid supply line 26 could not project axially from adapter 10, the lines would be forced to bend relatively sharply, as illustrated by phantom lines 22' and 26' in FIG. 2, which would cause a weakening and possible crimping of the lines, adversely affecting the fluid flow therethrough. This is the case with the newer welding machines currently being developed.

The power cable adapter 50 of the present invention is configured so a to allow the power cable carrying line 22 and the fluid supply line 26 to approach and engage the adapter 50 in a parallel disposition and for the angle of the lines to be readily adjustable relative to the welding machine. As a result of the size and configurations of the newer welding machines, such an adjustable parallel alignment of the lines avoids the need for sharp bent in the lines and the resulting deleterious affects on the lines and the fluid flow therethrough.

Figures 3, 4:
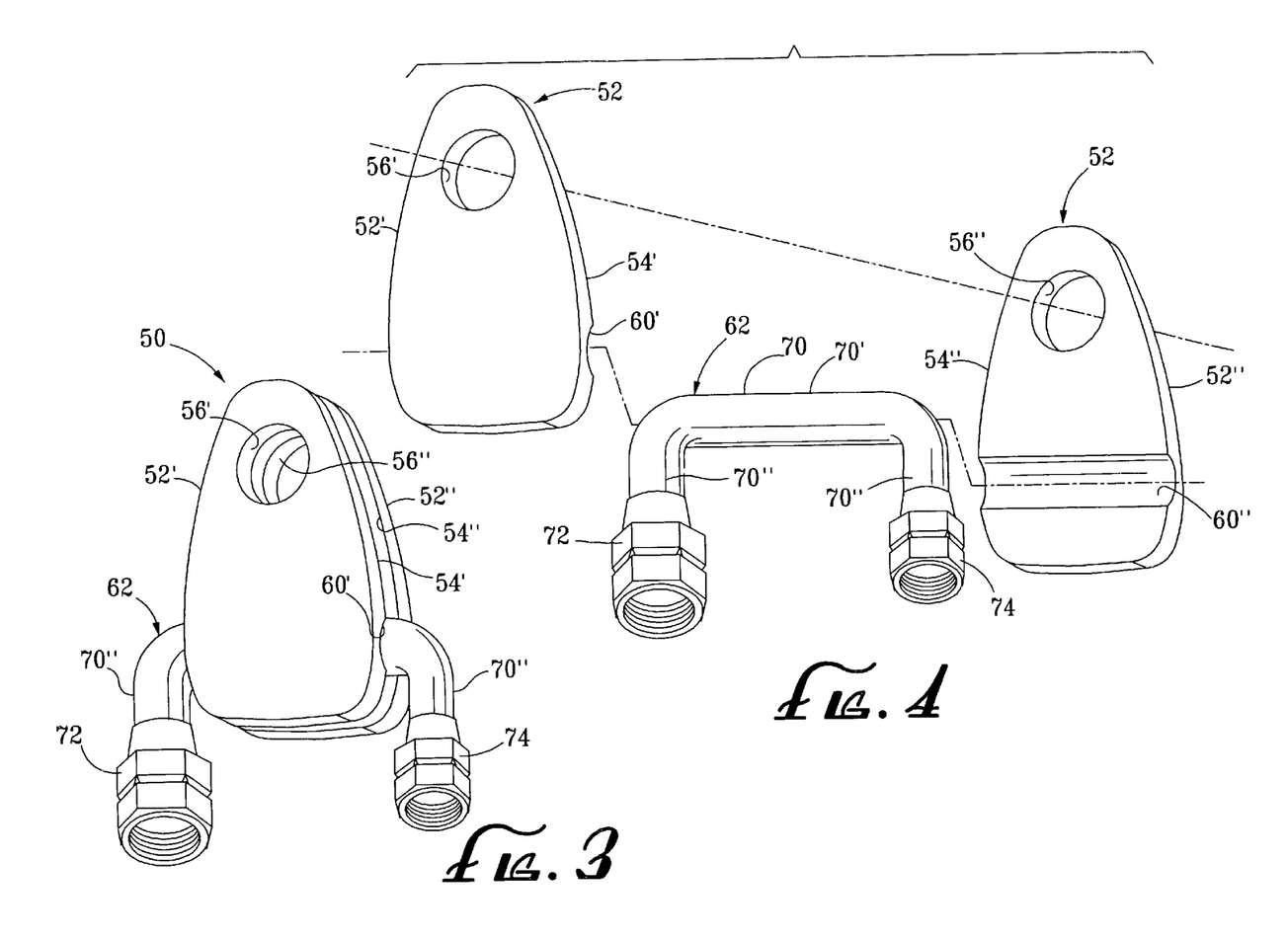
FIG. 3 is a perspective view of the power cable adapter of the present invention.
FIG. 4 is an exploded perspective view illustrating the components of the power cable adapter of the present invention.

The cable adapter 50 of the present invention comprises clamp 52 formed by a pair of clam shell type clamp sections 52' and 52" machined from brass or copper forgings, castings or billet materials. The clamp sections are preferably identical in configuration and, as seen in FIG. 4, each respectively defines a flat contact surface 54' and 54", a circular aperture 56' and 56" in an upper end portion 58' and 58" of the section and an open ended channel 60' and 60" extending laterally across a lower portion of the contact surfaces 54' and 54" of the two clamp sections. Channels 60' and 60" are open along contact surfaces 54' and 54", preferably of constant radius in cross-section and define arcs of less than 180°. Thus, if the two clamp sections 52' and 52" were disposed together with their contact surfaces 54' and 54" in mating contact, a channel 60 would be defined which would be substantially elliptic in cross-section and extend transversely through the clamp 52 between sections 54' and 54". As will be discussed later herein, channels 60' and 60" need not be of constant radius. They could also each have a semi-elliptical cross-section. Apertures 56' and 56" are positioned such that when the two clamp sections are disposed together, a single circular aperture 56 is defined in the upper end portion of clamp 52, the central axis of which is perpendicular to the longitudinal axis of channel 60.

Channels 60' and 60" in clamp sections 52' and 52" are adapted to cooperate in the securement of a fitting tube assembly 62 between the two clamp members as will be explained. Aperture 56 is oriented and is sized to receive the threaded output stud 17 on the welding machine 18 for securement of the clamp 52 to the welding machine. The output studs on a typical TIG torch welding machine are 0.5 in. in diameter. The securement of the adapter 50 on stud 17 is accomplished by the threaded engagement of a securement nut 20 with stud 17. Upon tightening of the nut 20 on stud 17 such that the nut and an adjacent washer 65 bear tightly against the adapter 50, the adapter is firmly secured on the stud with the upper portion of the outer clamp member 52' being pressed against the upper portion of the inner clamp member 52" and the lower portions of the clamp being pressed against the fitting tube assembly 62. So secured, the adapter lies substantially flat adjacent the welding machine in electrical communication the stud. A spacing collar 15 formed of an insulating material is provided on the welding machine about stud 17 hat is larger in diameter than clamp aperture 56 so as to provide a surface against which the rearwardly disposed clamp section 52" is pressed upon the tightening of the securement nut 20 against the forward clamp section 52'. Collar 15 also prevents contact between the electrically conductive adapter and the body of the welding machine.

The fitting tube assembly 62 which is carried by the clamp members 52' and 52" preferably comprises a U-shaped hollow copper or brass tube 70 having threaded connector fittings 72 and 74 soldered, brazed or welded onto the extended ends thereof. Tube 70, which is preferably of a constant diameter along its entire length, defines a lateral extension portion 70' and parallel leg portions 70". These portions of tube 70 are sized such that upon disposing the clamp sections 52' and 52" about the lateral extension portion 70' of fitting tube 62, the curvilinear wall surfaces defining the channels 60' and 60" in the two clamp sections bear against opposed sides of the lateral portion 70' of the fitting tube. Thus, upon the clamping members being pressed together by securement nut 20, the fitting tube assembly is physically secured in place between the clamp members and electrical contact between the clamp members and fitting tube is established.

Figures 5, 7A:
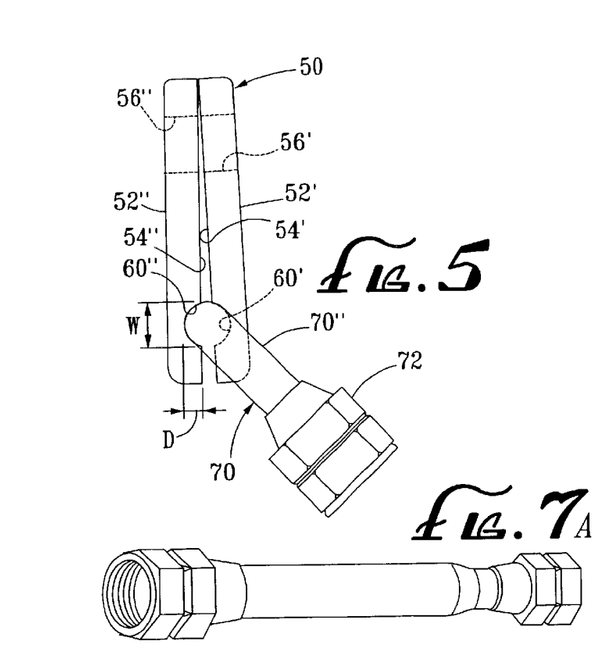
FIG. 5 is a side view of the power cable adapter of the present invention.
FIGS. 7a and 7b are perspective views of alternate fitting tube configurations.

In the embodiment of the clamp 52 shown in FIGS. 3–5, the inner contact surfaces 54' and 54" of the two clamp members 52' and 52" are flat to facilitate fabrication by forging or investment casting. Accordingly, when the outer clamp member 52' is pressed against the inner clamp member 52" by the tightening of the threaded nut 20 on the output stud 17, the contact surfaces of the clamp members will abut at their upper ends with the rear clam member extending vertically downwardly and the forward clamp member extending downwardly at a slight angle about the tube fitting 62 as seen in FIG. 5. As a result, the outer surface of the outer clamp member is angularly disposed with respect to the output stud. Thus, the washer 65 disposed between the outer clamp member and the nut 20 preferably defines a curvilinear surface (not shown) to provide a better abutment surface for the clamp nut. Alternatively, an inwardly projecting foot portion (not shown) could be provided at the upper end of one or both of the contact surfaces such that when the two clamp members are pressed together he clamp members would be in parallel alignment about the fitting tube assembly thereby obviating the need for a curved washer. An example of such a foot member is seen at 204 in FIG. 10. Alternatively, a washer having a tapered outer surface could be disposed about the output stud 17 between the upper portions of contact surfaces 54' and 54" to provide parallel alignment o the two clamp members. In yet another embodiment, a tapered boss could be provided about aperture 56' on the outer clamp member 52' to provide a flat abutment surface for a conventional washer and the clamp nut.

To insure the firm securement of the fitting tube 70, channels 60' and 60" each define a depth (D) that, when added together, is less than the outer diameter of tube 70. The transverse dimension or width (W) or the channel should be equal to slightly larger than the outer diameter of the tube 70 to prevent scarring of the tube by the lateral edges of the channels upon the clamp members being tightened about the tube. In the preferred embodiment, the channels 60' and 60" are identical in size and configuration and each define a constant radius of curvature that is equal to the radius of tube 70 so as to maximize the area of electrical contact between the tube and clamp members and prevent scarring of the tube during securement. The depth of each of the channels is, of course, less than the width (W) of the channels and thus less than the radius of the tube to provide the necessary clamping pressure on the tube. The lateral portion 70' of the fitting tube is of sufficient length so as to project the parallel leg portions 70" of the fitting tube beyond the lateral side wall portions of the clamp sections. Similarly, the leg portions 70" of fitting tube 70 are of sufficient length so as to clear the fittings 72 and 74 carried thereby beyond the lower end portion of the clamp 52.

In the above-described embodiment of the present invention, tube 70 is constructed of cooper and defines an outer diameter of 0.405 in. and a wall thickness of 0.098 in. The relatively thick wall prevents the tube from deforming when the clamp members are pressed tightly against the tube by the fastening member 20 while securing the adapter on the outlet stud of the welding machine. The open channels 60' and 60" in the clamp sections 52' and 52" each define a width (W) of about 0.405 in. and a depth (D) of about 0.125 in. It is to be understood however, that the size and configuration of channels 60' and 60" could be varied substantially and accomplish the purpose of providing the physical securement and electrical contact between clamp 52 and tube assembly 62. In the above described embodiment, the two channel portions 60' and 60" are identical in size and configuration as are the two clamp sections 52' and 52" so that only a single clamp configuration need be produced to reduce the cost of manufacture. This, of course, need not be the case and the two channels need not be the same size or configuration. In fact, the adapter 50 would be operable without any channel being formed by the two contact surfaces of the clamp sections. However, such an embodiment would render the physical securement of the fitting tube assembly more tenuous and thus be far less desirable than one in which the two clamp members were provided with opposed channel walls for gripping and securing the conductive hose in place between the two clamp members.

With the clamp 52 secured on the output stud 17 of the welding machine 18 about the fitting tube assembly 62, the torch power cable carrying line 22 can be easily coupled with fitting 72 by means of a conventional mating connection 22' on line 22 and the water or a gas supply line 26 can be readily coupled with fitting 74 by mating connection 26' on line 26 to establish the electrical connection between the power cable within line 22 and the output stud 17 and fluid communication between lines 22 and 26 through fitting tube 70. The fittings 72 and 74 on assembly 62 are of a conventional type adapted to mate with the standard fittings provided on the torch lines. Typically, such fittings are formed of brass and provided with threads for engagement with mating threads on the line fittings. However other fitting configurations could be employed to mate with the fittings provided on the welding torch lines. While fitting 72 must be constructed of an electrically conductive material such as brass or cooper to effect the electrical connection between the torch power cable in line 22 and conductive tube 70, fitting 74 need only make a physical connection between tube 70 and a fluid supply line 26 while allowing fluid flow therethrough. Accordingly fitting 74 need not be electrically conductive.

Figure 6:
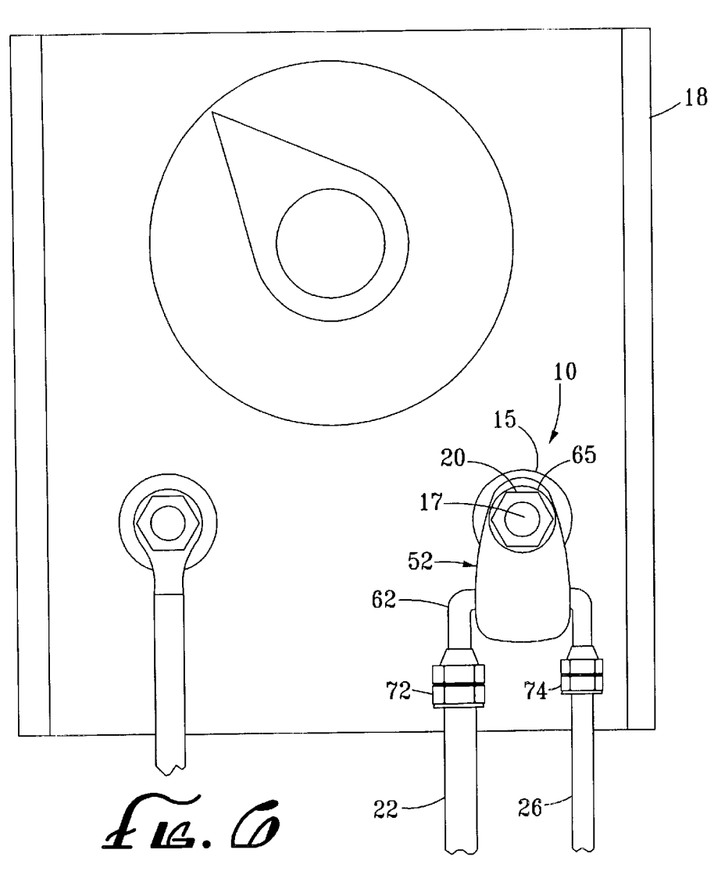
FIG. 6 is a plan view showing the power cable adapter of the present invention secured to a output stud on a welding machine and illustrating the parallel connections of the torch lines.

As seen in FIG. 6, the parallel alignment of the leg portions 70" of the fitting tube in the adapter 10 allows torch lines 22 and 26 to extend in parallel to and from the adapter. In addition, the securement of the fitting tube assembly 62 in clamp 52 readily allows the operator to adjust the angular orientation of the fitting tube assembly relative to the clamp 52 and welding machine 18 by simply loosening the securement nut 20 on the output stud 17 so as to relieve the pressure exerted by the clamp sections 52' and 52" on tube 70, rotate tube 70 to a desired angular orientation and retighten the securement nut. The parallel alignment of the fluid carrying lines in combination with the variable angular orientation of the fitting tube assembly relative to the welding machine, allows the lines to extend to and from the adapter in the confined space of line smaller welding machines without having to negotiate any sharp line stressing and restricting turns.

Figure 7B:
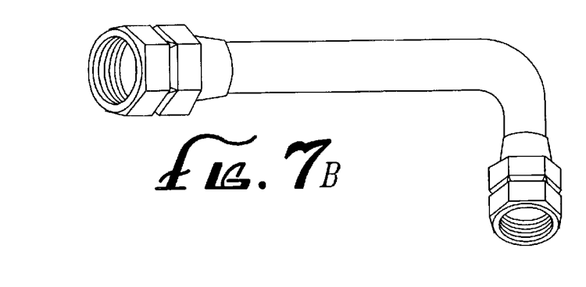

As different welding machines will vary somewhat in design configuration, it is sometimes desirable to be able to vary the fitting tube configuration to accommodate the different machine designs. While the angle at which the torch lines enter adapter 50 is adjustable as described above, power cable adapter 50 can also readily employ a variety of fitting tube configurations to further accommodate different machine designs. For example, FIGS. 7a and 7b illustrate straight line and right angle designs for use with clamp 52. Other tube configurations could also be employed. Thus, power cable adapter 50 provides a highly compact, versatile and inexpensive connection between the torch lines and welding machine.

Figure 8:
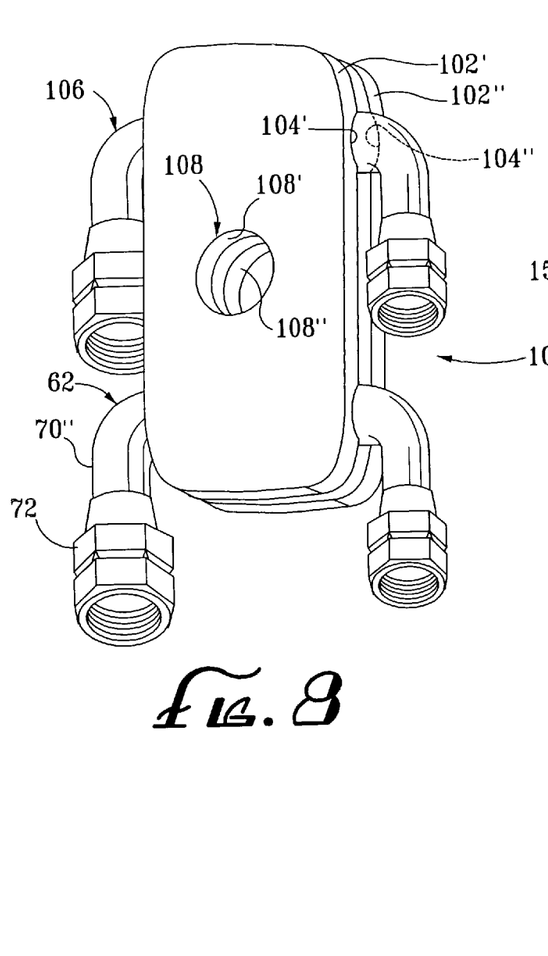
FIG. 8 is a perspective view of a second embodiment of the power cable adapter of the present invention.
Figure 9:
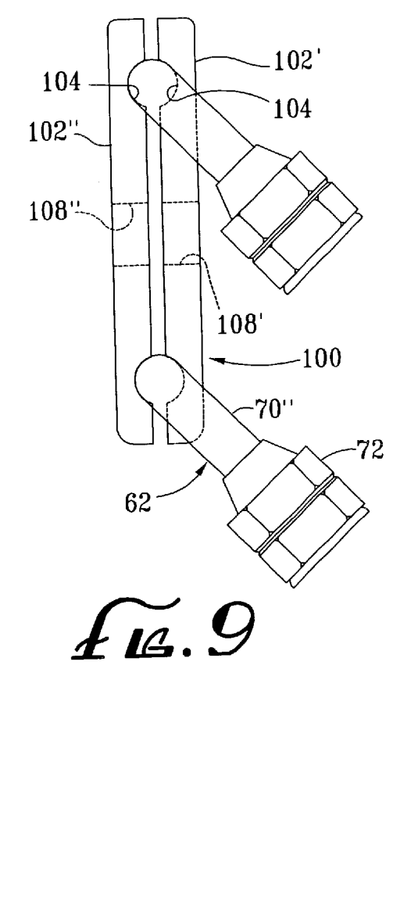
FIG. 9 is a side view of the second embodiment of the power cable adapter of the present invention illustrated in FIG. 8.

A second embodiment of the present invention is illustrated in FIGS. 8 and 9. As seen therein, the power cable adapter 100 is comprised of extended clamp sections 102' and 102" that cooperate to define a second laterally extending channel 104 therein to accommodate a second fitting tube assembly 106. Power adapter 100 allows the operator to connect two separate torches to the same welding machine at the same time as it is often desirable to have a small lightweight torch and a larger heavy duty torch connected simultaneously so that the welder can select the torch best suited for each welding operation in the job at hand. To accommodate the second fitting tube assembly 106, the two clamp sections 102' and 102" each define laterally extending open channels 104' and 104" therein that are of the same configuration and cooperate in the same manner as channels 60' and 60" to secure the tube fitting assembly 62 in adapter 50. Adapter 100 is secured to the welding machine by means of aperture 108 and a threaded fastening member in the same manner as adapter 50 of the prior embodiment. To accommodate the two lateral channels, the aligned apertures 108' and 108" are preferably centrally disposed in clamp sections 102' and 102" as opposed to being positioned in the upper end portion of the clamp members in adapter 50.

Figure 10:
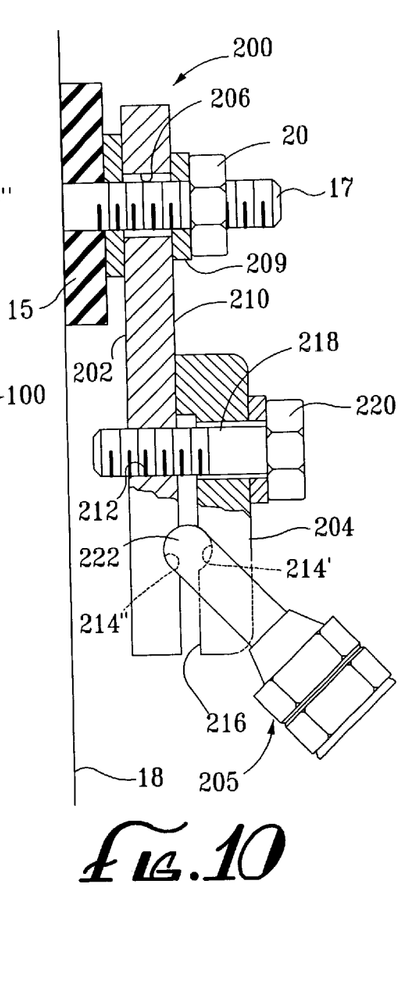
FIG. 10 is a side view of a third embodiment of the power cable adapter of the present invention.

A third embodiment of the invention is illustrated in FIG. 10. On certain welding machine designs, it would be desirable to have an extended adapter to lower the location of the hose attachment fittings. Adapter 200 provides such an extension. As seen in FIG. 10, adapter 200 comprises a rear elongated clamp member 202, a foreshortened forward clamp member 204 and a fitting tube assembly 205. The rear clamp member 202 defines a first circular aperture 206 an upper portion thereof adapted to receive the output stud 17 on the welding machine. A threaded securement nut 20 threadably engages stud 17 and bears against a washer 209 to secure the clamp member 202 on the stud against the insulating collar 15. The rear clamp member 202 also defines a forward facing contact surface 210, a threaded aperture 212 disposed below and in parallel alignment with the aperture 206 in clamp member 204 and an open channel 214' extending laterally across a lower portion of surface 210. The forward clamp member 204 defines a rearwardly facing contact surface 216 adapted to abut surface 210 on the rear clamp member 202 and a circular aperture 218 adapted to be axially aligned with aperture 212 and receive a threaded fastening member 220 for securement of the forward clamp member to the rear clamp member. The forward clamp member 204 further defines an open channel 214" extending laterally across a lower portion of contact surface 216. Channel 214' opposes and cooperates with channel 214' in clamp member 202 to receive and secure the fitting tube assembly 205. Channels 214' and 214" are of the same configuration as channels 60' and 60" and 104' and 104" in the prior embodiments. The fitting tube assembly 205 is of the same configuration as assemblies 62 and 106. Upon inserting the threaded fastening member 220 through the aperture 218 in the forward clamp member 202 and threadably engaging the rear clamp member 200 about aperture 212, the forward clamp member is pressed against the rear clamp member such that the contact surfaces are in physical and electrical contact with each other and the curvilinear wall portions defining channels 214' and 214" bear against the conductive tube 222 of the fitting tube assembly 205. Through such an assembly, the adapter 200 lowers the positioning of the fitting tube assembly while maintaining the flexibility afforded by the adapters of the prior embodiments. In addition, the mounting of adapter 200 leaves a portion of the output stud 17 on the welding machine sufficiently exposed beyond the securement nut 20 so as to allow auxiliary equipment, such as a stick welding electrode holder, to be concurrently connected to the welding machine on stud 17 if desired.

Various other changes and modifications may be made in carrying out present invention without departing from the spirit and scope thereof. Insofar as these changes and modifications are within the purview of the appended claims, they are to be considered as part of the present invention.

What is claimed:

1. A power cable adapter for use with a welding torch assembly to electrically couple the power cable in the cable carrying line with the power output stud on the welding machine and communicate the cable carrying line with a fluid supply line for the passage of fluid therethrough, said adapter comprising:

a pair of electrically conductive clamp members adapted to be secured to the output stud in an adjacent disposition, each of said members defining an aperture extending therethrough, a contact surface and an open channel extending laterally across said surface, whereby upon said surfaces being disposed in substantially adjacent juxtaposition, said apertures are axially aligned to define a cylindrical opening adapted to receive the output stud and said channels extend in opposed disposition perpendicular to a central axis of said opening;

a fitting tube assembly including a hollow electrically conductive tube and a pair of torch line connector fittings carried by the ends of said tube, said tube being adapted to extend along said channels between said clamp members and project from the ends of said channels such that upon said clamp members being urged together, said tube is secured between and in electrical contact with said clamp members and said fittings are spaced from said clamp members, one of said fittings being adapted for electrical communication with the power cable and fluid communication with said cable carrying line and the other of said fittings being adapted for fluid communication with the fluid supply line; and a fastener member for urging said clamp members together about said tube and securing said adapter on said output stud.

2. The power cable adapter of claim 1 wherein said conductive is of a U-shaped configuration whereby upon the cable carrying line and fluid supply line being secured to said connectors, said lines extend from said connectors in a parallel disposition an said threaded member allows for the angular orientation of the lines from the clamp members to be selectively varied.

3. The power cable adapter of claim 1 wherein said clamp members are of substantially identical configuration.

4. The power cable adapter of claim 1 wherein each of said clamp members additionally defines a second open channel extending laterally across said contact surface parallel to and spaced from the first channel therein, and including a second fitting tube assembly including a second electrically conductive tube and a pair of second cable connector fittings carried by the ends of said second tube, said second tube being adapted to extend along said second channels between said clamp members and project form the ends of said channels such that upon said clamp members being urged together, said second tube is in electrical contact with said clamp members and said second fittings are spaced from said clamp members for securement to and communication with additional welding torch lines whereby two welding torches can be operatively coupled to a single welding machine for selective use by a welder.

5. The power cable adapter of claim 1 wherein said channels define curvilinear wall portions for abutting portions of said conductive tube and securing said tube assembly in electrical contact with said clamp members upon said clamp members being urged together about said conductive tube by said fastener member.

6. The power cable adapter of claim 5 wherein said tube defines a constant radius portion extending along said channels, and curvilinear wall portions each define a continuous constant radius along the lenght thereof, the radius defined by each of said wall portions being substantially equal to the raduis defined by said constant radius portion of said tube such that said wall portions are in continuous contact with said portions of said tube and wherein said constant radius defined by each of said wall portions defines an arc of not less than 180°.

7. The power cable adapter of claim 1 wherein said open channels each define a constant depth of a first dimension and a constant width of a second dimension, each of said second dimensions being greater than said first dimensions.

8. The power cable adapter of claim 1 wherein said conductive tube is of a U-shaped configuration whereby upon the cable carrying line and fluid supply line being secured to said connectors, said lines extend from said connectors in a parallel disposition and said threaded member allows for the angular orientation of the lines from the clamp members to be selectively varied.

9. The power cable adapter of claim 1 wherein said open channels each define a constant depth and a constant width along the length thereof, a first dimension equal to the depth said channel and a second dimensionequal to the width thereof and said tube defines a constant diameter portion extending along said channels, the sum of said first dimesions being less than the diameter defined by said constant diameter portion of said tube and said second dimensions being equal to or greater than the diameter defined by said constant diameter portion.

10. The power cable adapter of claim 9 wherein said conductive is of a U-shaped configuration whereby upon the cable carrying line and fluid supply line being secured to said connectors, said lines extend from said connectors in a parallel disposition and said threaded member allows for the angular orientation of the lines from the clamp members to be selectively varied.

11. A power cable adapter for use with a welding torch assembly to electrically couple the power cable in the cable carrying line with the power output stud on the welding machine and communicate the cable carrying line with a fluid supply line for the passage of fluid therethrough, said adapter comprising:

a pair of electrical conductive clamp members adapted to be secured to the output stud in an adjacent disposition, each of said members defining an aperture extending therethrough, a contact surface and an open channel extending laterally across said surface whereby upon said contact surfaces being held in substantially adjacent juxtaposition, said apertures are axially aligned to define a cylindrical opening adapted to receive the output stud and said channels extend in opposed disposition perpendicular to a central is of said opening, and wherein said channels each define a constant depth of a first dimension and a constant width of a second dimension, each of said second dimensions being greater than said first dimensions;

a fitting tube assembly including a hollow electrically conductive and substantially U-shaped tube and a pair of cable connector fittings carried by the ends of said tube, said tube being adapted to extend along said channels between said clam members and project from the ends of said channels such that upon said clamp members being urged together, said tube is in electrical contact with said clamp members and said fittings are spaced from said clamp members and aligned in parallel, one of said fittings being adapted for electrical communication with the power cable and fluid communication with said cable carrying line and the other of said connectors being adapted for fluid communication with the supply line; and a fastening member for urging said clamp members about said tube and securing said adapter on said output stud.

12. The power cable adapter of claim 11 wherein said tube define a constant radius portion extending along said channels, said channels each define a continuous, constant radius along the length thereof, and wherein the radius defined by each of said wall portions is substantially equal to the radius defined by said constant radius portion of said tube.

13. The power cable adapter of claim 11 wherein each of said clamp members additionally defines a second open channel extending laterally across said contact surface parallel to and spaced from the first channel therein, and including a second fitting tube assembly including a second electrically conductive tube and a pair of second cable connector fittings carried by the ends of said second tube, said second tube being adapted to extend along said second channels between said clamp members and project from the ends of sad channels such that upon said clamp members being urged together, said second tube is in electrical contact with said clamp members and said second fittings are spaced from said clamp members for securement to and communication with additional welding torch lines whereby two welding torches can be operatively coupled to a single welding machine for selective use by a welder.

14. A power cable adapter for use with a welding torch assembly to electrically couple the power cable in the cable carrying line with the power output stud on the welding machine and communicate the cable carrying line with a fluid supply line for the passage of fluid therethrough, said adapter comprising:

a rear clamp member adapted to be secured to the output stud on the welding machine and defining a first aperture extending through an upper portion thereof adapted to receive the output stud for securing the adapter thereon, a contact surface and an open channel extending laterally across a lower portion of said surface;

a forward clamp member adapted to be carried by said rear clamp member in substantial adjacent juxtaposition, said forward clamp member defining a contact surface and an open channel extending laterally across a lower portion of said surface;

a fastener assembly carried by and extending between said forward clamp member and said rear clamp member for urging said clamp members together in substantially adjacent juxtaposition such that said channels extend in opposed alignment perpendicular to a central axis extending through said first aperture in said rear clamp member; and a fitting tube assembly including a hollow electrically conductive tube and a pair of torch line connector fittings carried by the ends of said tube, said tube being adapted to extend along channels between said clamp members and project from the ends of said channels such that upon said clamp members being urged together by said fastener assembly, said tube is secured in electrical contact with said clamp members and said fittings are spaced from said clamp members, one of said fittings being adapted for electrical communication with the power cable and fluid communication with said cable carrying line and the other of said fittings being adapted for fluid communication with the fluid supply line.

15. The power cable adapter of claim 14 wherein said rear clamp member defines a threaded aperture therein between said channel and said first aperture, said forward clamp member defines an aperture extending through an upper portion thereof and wherein said fastener assembly comprises a threaded fastener adapted to extend through said aperture in said forward clamp member and into said threaded aperture in said rear clamp member, threadably engaging said rear clamp member.

16. The power cable adapter of claim 14 wherein said conductive be is of a U-shaped configuration whereby upon the cable carrying line and fluid supply line being secured to said connectors, said lines extend from said connectors in a parallel disposition and said threaded member allows for the angular orientation of the lines from the clamp members to be selectively varied.

17. The power cable adapter of claim 14 wherein said open channels each define a constant depth of a first dimension and a constant width of a second dimension, each of said second dimensions being greater than said first dimensions.

18. The power cable adapter of claim 14 wherein said tube defines constant radius portion extending along said channels, said channels each define a continuous constant radius along the length thereof, and wherein the radius defined by each of said wall portions is substantially equal to the radius defined by said constant radius portion of said tube.

* * * * *

UNITED STATES PATENT AND TRADEMARK OFFICE
CERTIFICATE OF CORRECTION

PATENT NO. : 6,386,895 B1
DATED : May 14, 2002
INVENTOR(S) : Richard B. Rehrig

It is certified that error appears in the above-identified patent and that said Letters Patent is hereby corrected as shown below:

Column 8,
Line 60, after "conductive" insert -- tube --.

Column 9,
Line 9, change "form" to -- from --.
Line 26, change "lenght" to -- length --.
Line 47, before "said" insert -- of --, and change "dimensionequal" to -- dimension equal --.
Line 55, after "conductive" insert -- tube --.

Column 10,
Line 8, change "is" to -- axis --.
Line 17, change "clam" to -- clamp --.
Line 45, change "sad" to -- said --.

Column 12,
Line 8, change "be" to -- tube --.

Signed and Sealed this

Twenty-fifth Day of March, 2003

JAMES E. ROGAN
*Director of the United States Patent and Trademark Office*